United States Patent [19]

Matsubara

[11] 3,774,715
[45] Nov. 27, 1973

[54] VEHICLE CONSTANT-SPEED CRUISING DEVICE

[75] Inventor: Hiroshi Matsubara, Sayama-shi, Japan

[73] Assignee: Diesel Kiki Kabushiki Kaisha, Tokyo, Japan

[22] Filed: Nov. 2, 1971

[21] Appl. No.: 194,886

[30] Foreign Application Priority Data
Nov. 24, 1970 Japan.............................. 45/102710

[52] U.S. Cl................................. 180/108, 123/102
[51] Int. Cl................................................ B60k 31/00
[58] Field of Search...................... 123/102; 180/108

[56] References Cited
UNITED STATES PATENTS
3,183,993  5/1965  Parker et al.................... 123/103 R
3,340,952  9/1967  Day...................................... 180/108
3,635,306  1/1972  Davis.................................. 123/102

Primary Examiner—Kenneth H. Betts
Assistant Examiner—John M. McCormack
Attorney—Larson, Taylor and Hinds

[57] ABSTRACT

A vehicle constant-speed cruising device that is simple in construction, in which a rotary fluid-pressure converter of the type mentioned above is employed in such a way as to generate an output related to a differential pressure between the atmosphere and a space in communication with an air intake pipe of an engine.

3 Claims, 4 Drawing Figures

PATENTED NOV 27 1973　　　　　　　　　　　　　　　　3,774,715

VEHICLE CONSTANT-SPEED CRUISING DEVICE

This invention relates to a vehicle constant-speed cruising device for automatically enabling vehicles such as automobiles to cruise with a constant speed at any desired level of speed, and concerns in particular a device in which a magnet rotating in response to the cruising speed of the automobile, for example, is used in opposition to a circular disc made of a non-magnetic material having a good electrically conductive property and coupled with said disc, so as to produce an eddy current proportional in magnitude to the difference in rotating speed between the two torque or moment of a force occurring in said disc being supportingly countered by a force of a spring in such a way that a cross section area of a path of flow in a fluid nozzle is changed by a displacement of said disc to control a force acting on a pressure-responding member, and a mechanical displacement of said pressure-responding member being transmitted to a fuel control member on an engine.

A number of automatic constant-speed cruising devices for vehicles have been proposed thus far but a cruising speed detecting part and an output part in these devices are invariably complex in construction.

An object of this invention is to provide a vehicle constant-speed cruising device that is simple in construction, in which a rotary fluid-pressure converter of the type mentioned above is employed in such a way as to generate an output related to the differential pressure between the atmosphere and a space in communication with an air intake pipe of an engine.

Figure 1A:
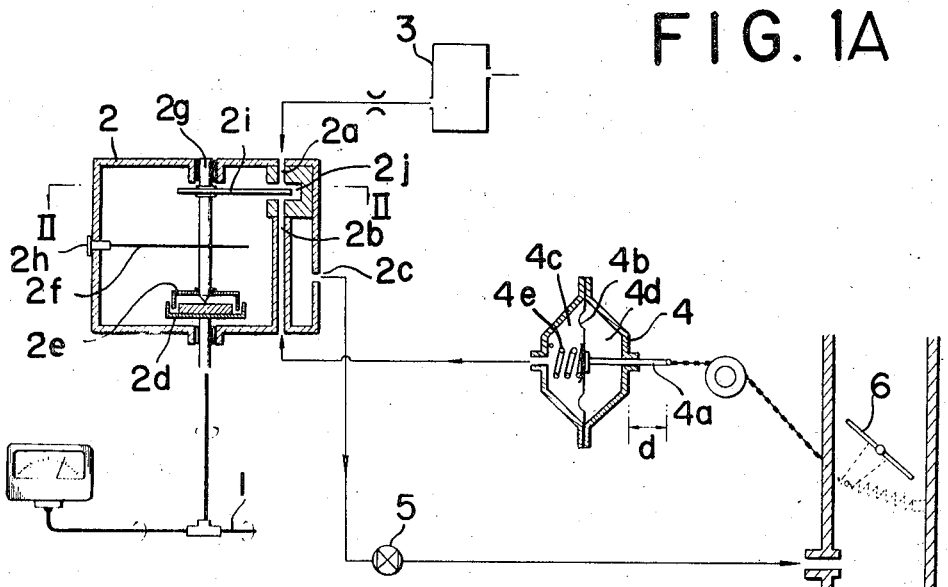
Figure 1B:
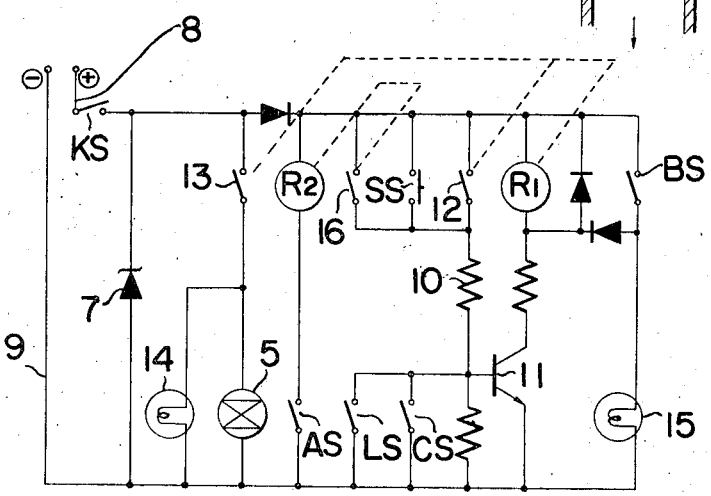
Figure 2:
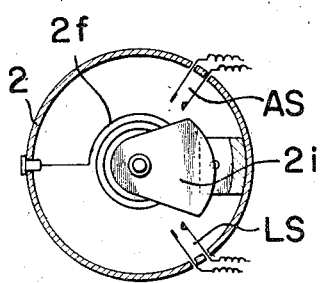
Figure 3:
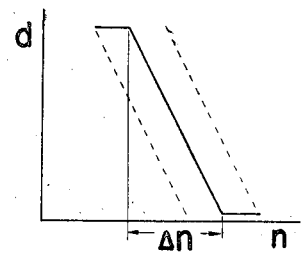

The invention will be made clear by describing a preferred example thereof shown in the accompanying drawing, wherein FIG. 1A schematically shows the vehicle constant-speed cruising device according to the invention, FIG. 1B is a schematic circuit diagram of the electrical circuit of the device of FIG. 1A, FIG. 2 is a cross section taken along line II—II in FIG. 1 to illustrate a part of the rotary fluid-pressure converter, FIG. 3 is a graph depicting the operating characteristic of the device of this invention.

In FIG. 1A, a speedometer cable 1 provides an input to a rotary drive fluid-pressure converter 2. An air inlet 2a of converter 2 communicates with the atmosphere through an air filter or cleaner 3; an air outlet 2b communicates with a pressure-responsive member 4; and another outlet 2c communicates with an air intake pipe of a engine through a solenoid valve 5 so that negative pressure will be introduced within said converter 2 when pressure in the air intake pipe is negative. The air inlet 2a and air outlet 2b communicate with the interior of casing 2 and hence the pressure communicated to pressure-responsive member 4 is a function of the pressure in the air intake pipe. A movable element 4a in the pressure-responding member 4 is interconnected with a throttle valve 6 by means of a wire or similar means so as to parallel an existing throttle valve actuating means to thereby provide a throttling opening in response to a cruising speed of a vehicle.

Each part and member will be explained in detail.

The rotary fluid-pressure converter 2 comprises, within a tight enclosure, a rotating magnet 2d driven by the speedometer cable 1, and a circular disc 2e made of a non-magnetic and highly conductive material, positioned in coaxial opposition against said magnet, said disc being rigidly mounted on a rotary shaft 2g to receive the torque exerted by a spiral spring 2f. The outer end of the spring is secured to a knob 2h held in the converter case. Turning this knob will adjust the torque exerted by said spring. A shield plate 2i mounted on rotary shaft 2g, and has a portion of its contour so curved that the radial distance between the edge of the curved portion and shaft 2g varies for different points on the edge according to rotation. This curved portion is located in a slit 2j extending transversely through the path of air, there being no contact between said shield plate and slit. Thus, the rotary movement of said shield plate against the force of the spiral spring increases the cross section area of the path of the air. An automatic (auto) reset switch AS and a low speed switch LS are secured to and extend inwardly from the housing or casing wall of converter 2 into the path of shield plate 2i, switches AS and LS being located on opposite sides of shield plate 2i as indicated in FIG. 2. Auto reset switch AS is actuated or closed by shield plate 2i when the shield plate 2i is angularly displaced a predetermined distance in the "high speed" direction whereas low speed switch LS is actuated by shield plate 2i when the latter is angularly displaced a predetermined distance in the "low speed" direction.

The air path across said slit is formed by an air supply nozzle 2a communicating with the atmosphere and an air receiving nozzle 2b connected to the pressure-responding member 4 so that a free injection stream of the air can be introduced between the two nozzles. In the pressure-responding member 4, which is constructed according to a known design, the internal space is divided into chambers 4c and 4d by a diaphragm 4b urged by a spring 4e. The air pressure (negative) occurring in said converter 2 is led into said chamber 4c. A movable element 4a has its one end secured to the center of the diaphragm 4b and the other end connected to the throttle valve 6. The electrical part of solenoid valve 5 in the path of negative pressure leading to air outlet 2c is located in the control circuit of this constant-speed cruising device. Numerals KS, BS and CS in FIG. 1B designate a start switch (key switch), a brake switch and a clutch switch respectively.

The operation of the control circuit will be now explained. A constant voltage is secured by a Zener diode 7 which is connected between positive and negative leads 8 and 9. Closing of the set switch SS, when the vehicle, in a cruising condition comes up to a constant speed, causes current flow from the positive lead 8 through the set switch SS and a resistor 10 to the base of a transistor 11, thereby switching on this transistor 11 to introduce emitter current from the positive lead 8 to negative lead 9. This emitter current, causes energization of a relay R1 and consequent closing of self-holding contact 12 and solenoid valve energizing contact 13 of relay R1, thereby driving the valve 5 into open position and, at the same time, lighting up a pilot lamp 14 connected across the valve to admit the internal pressure of the engine intake pipe into converter 2.

Assume that the automobile cruising with a certain speed comes to the top of a downhill stretch of road. Engine load would then fall to raise engine speed, and consequently a moment is imparted to the circular disc 2e proportional to the increased speed of the rotary magnet 2d, that is, to the increased speed of the vehicle. By this moment, the shield plate 2i displaces itself angularly against the force of the spring 2f by an amount proportional to the change in cruising speed, so that the cross section area in the path of air between the nozzles 2a and 2b increases to let the atmospheric pressure communicate with the pressure-responding member 4. Thereupon, diaphragm 4b displaces itself under the force of the spring 4e to turn the throttle valve 6 in the direction for decreasing the cruising speed.

The drop in cruising speed so initiated becomes fed back to the rotary fluid-pressure converter 2 to perform an automatic control action. The foregoing sequence of events takes place in the same order but in reverse direction when the load on the engine increases.

Depressing the brake pedal during constant-speed cruising closes the brake switch BS to turn on a pilot lamp 15, placing both terminals of a relay R1 at the same potential to de-energize this relay. When this occurs, the contacts 12 and 13 will open, allowing the solenoid valve 5 to close. With the solenoid valve closed, the pressure within converter 2 becomes equal to the atmospheric pressure and thus the diaphragm 4b moves to turn the fuel throttle valve 6 in the direction for decreasing the fuel supply, whereby the constant-speed cruising under automatic control is terminated.

Depressing the accelerator pedal subsequently causes the automobile to pick up cruising speed, closing the auto reset switch AS by the rotary movement of the shield plate 2i, so that a relay R2 becomes energized by the closing a contact 16 thereof to initiate the constant-speed cruising effecting the same setting action as has been described in the above. Depressing the clutch pedal while the automobile is cruising with a constant speed results in a closure of the clutch switch CS to shunt the base-emitter current and thus turn off transistor 11. Thereupon, the solenoid valve 5 closes the path of negative pressure, bringing the atmospheric pressure into converter 2 and causing diaphragm 4b to move the fuel throttle valve 6 in the direction for decreasing fuel supply. By releasing the clutch pedal to open the switch CS and by depressing the accelerator pedal, the constant-speed cruising can be resumed.

A contact of the low speed switch LS provided in converter 2 may be made to stay closed by the rotary movement of the shield plate 2i under 30 km/hr, for example. As the contact is so closed, the base-emitter current becomes shunted on transistor 11 to prevent relay R1 from getting energized; this prevents constant-speed cruising. Thus, the object of the low speed switch is to prevent the engine from overspeeding or racing in the event of breakage of speedometer cable or under a stalled or standstill condition of the automobile.

To set the constant speed desired, the knob 2h is to be turned to a proper position; turning this knob changes the adjustment of the spring.

FIG. 3 shows a speed control range $\Delta n$ in a graph, wherein a displacement $d$ of the pressure-responding member is plotted on an ordinate, and an engine or cruising speed $n$ on an abscissa, with the knob position as the parameter. An additional advantage will be seen from this graph in that, with the $\Delta n$ set and sealed to the upper limit of the revolution within a range extending up to the maximum speed specified for the automobile, the present device will permit the vehicle to be driven at any desired speed up to but not beyond the maximum; this means that the device can be made to serve as a speed limiter for protection against reckless overspeeding.

In the embodiment illustrated, the source of actuating power for the pressure-responding member is the negative pressure in the air intake pipe of the engine, but the same effect may be expected even with a positive-pressure air source.

Many variations may be effected without departing from the spirit of the invention.

What is claimed is:

1. A constant speed cruising control device for an engine driven vehicle including speed control means, said device comprising:
    1. a pressure responsive means including a movable element the displacement of which is proportional to the variation in the pressure thereon;
    2. means for coupling said pressure responsive means to the speed control means so that the engine speed of the vehicle is regulated relative to the displacement of the movable element of said pressure responsive means;
    3. a rotary fluid pressure converter comprising (a) a casing, (b) means defining a path which extends through said casing and which includes an air inlet at one end thereof in communication with the ambient air and an air outlet at the other end thereof in communication with said pressure responsive means, (c) means defining a slit in said path which divides the path into two parts and which permits said air inlet and said air outlet to communicate with the interior of said casing, (d) a further air outlet which communicates with the interior of said casing, (e) means for connecting said further air outlet to the intake of the engine so as to introduce a negative pressure in the interior of said casing, and including a solenoid valve connected therein for controlling initiation and termination of the operation of said pressure converter, (f) a shaft located within said casing, (g) electromagnetic means for imparting a rotational torque to said shaft in accordance with the speed of the vehicle and including a rotating magnet, (h) spring means coupled to said shaft for biassing said shaft in a direction opposing said torque, and (i) a shield plate rigidly mounted on said shaft for rotation therewith, a portion of the peripheral edge of said shield plate being curved so that there is a variation in the radial distance between said edge and the shaft and said shield plate extending into said slit transversely to said air path so that a variation in the rotational position of the shaft will alter the cross sectional area of said air path and hence the pressure communicated to said pressure responsive means; and
    4. means for controlling the actuation of said solenoid valve to control operation of said pressure converter.

2. A device as claimed in claim 1 wherein said means for controlling said solenoid valve includes an electrical circuit including solenoid means for controlling actuation of said solenoid valve, a start switch, a set switch, means for connecting said solenoid means, said start switch, and said set switch so that solenoid means is energized when both said start switch and said set switch are closed, a brake switch actuated responsive to the application of a vehicle brake, a clutch switch actuated responsive to the application of a vehicle clutch, and means for connecting said solenoid means, said start switch, said brake switch, and said clutch switch so that said solenoid means is de-energized when either of said brake switch or said clutch switch is closed or when said start switch is opened.

3. A device as claimed in claim 1 wherein said electrical circuit further comprises an automatic reset switch actuated by said shield plate when the vehicle speed exceeds a predetermined level and connected in series with a relay for initiating constant speed operation of the engine, and a low speed switch actuated by said shield plate when the vehicle speed drops below a further predetermined level for, when actuated, causing de-energization of said solenoid means.

* * * * *